United States Patent [19]

Schindler

[11] 4,193,693
[45] Mar. 18, 1980

[54] VELOCITY SERVO FOR CONTINUOUS SCAN FOURIER INTERFERENCE SPECTROMETER

[76] Inventor: Robert A. Frosch, Administrator of the National Aeronautics and Space Administration, with respect to an invention of Rudolf A. Schindler, Sierra Madre, Calif.

[21] Appl. No.: 880,729

[22] Filed: Feb. 24, 1978

[51] Int. Cl.² .................................................. G01B 9/02
[52] U.S. Cl. ................................................... 356/346
[58] Field of Search ........................................ 356/346

[56] References Cited

U.S. PATENT DOCUMENTS

| | | | |
|---|---|---|---|
| 3,488,123 | 1/1970 | Nichols | 356/346 |
| 3,535,041 | 10/1970 | Webb | 356/349 |
| 3,809,481 | 5/1974 | Schindler | 356/346 |
| 3,936,193 | 2/1976 | Auth | 356/346 |

*Primary Examiner*—Conrad J. Clark
*Attorney, Agent, or Firm*—Monte F. Mott; John R. Manning; Paul F. McCaul

[57] ABSTRACT

A velocity servo for a continuous scan Fourier interference spectrometer of the double-pass retroreflector type having two "cat's eye" retroreflectors uses an open-loop, lead-screw drive system for one retroreflector with compensation for any variations in speed of drive of the lead screw provided by sensing any variation in the rate of reference laser fringes, and producing an error signal from such variation used to compensate by energizing a moving-coil actuator for the other retroreflector optical path, and energizing (through a highpass filter) piezoelectric actuators for the secondary mirrors of the retroreflectors.

9 Claims, 2 Drawing Figures

VELOCITY SERVO FOR CONTINUOUS SCAN FOURIER INTERFERENCE SPECTROMETER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to interferometers utilizing double-pass cat's-eye retroreflectors, and more particularly to an improvement in the drive of a continuous scan interferometer of the type shown in U.S. Pat. No. 3,809,481.

In an interferometer (interference spectrometer) of the double-pass type, a single fixed mirror is employed in the path of both split beams to cause them to double back through separate retroreflectors. Changes in length of one optical path relative to the other are achieved by linear displacement of one retroreflector using a motor driven lead screw for large, low frequency changes, a moving-coil actuator in the other optical path for smaller, midfrequency changes, and a piezoelectric actuator on at least one of the two optical paths for small, high frequency changes. An object of this invention is to simplify the scanning servo system and circuit design without degrading performance.

SUMMARY OF THE INVENTION

In accordance with the present invention, the lead screw for moving a retroreflector in a continuous scan Fourier interference spectrometer of the double-pass type having two "cat's eye" retroreflectors is driven open loop to scan continuously from one extreme path difference to another using a synchronous motor energized from an AC current source of substantially constant frequency to move one retroreflector for changes in path length while sensing any variation in speed of the lead screw as a variation in the rate of reference laser fringes from a laser beam passing through the interference spectrometer into a separate detector. Any deviation from a predetermined fringe rate directly related to the desired lead-screw speed produces an error signal that is applied to a moving-coil actuator to change the path length through the other retroreflector in a compensating direction for correction in variations in the low frequency range of 5 to 500 Hz, and to a piezoelectrically driven secondary mirror for at least one of the two retroreflectors for variations with high frequency above 500 Hz. Variations in the very low frequency range of less than 5Hz will not occur in a properly designed motor driven lead screw using a synchronous motor.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
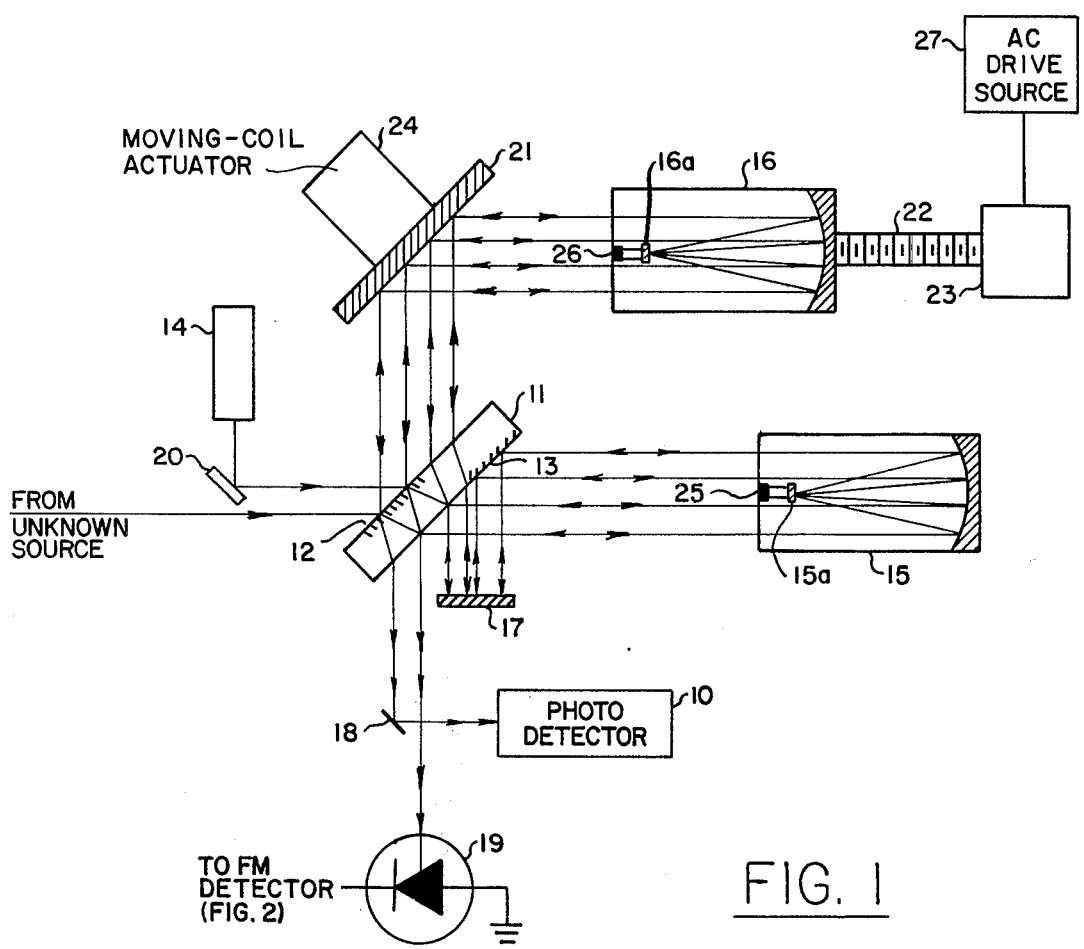
FIG. 1 is a schematic diagram of the optical system of an interferometer of the double-pass retroreflector type.

Referring now to FIG. 1, there is shown the optical system of an interferometer of the double-pass, cat's-eye retroreflector type more fully described in the aforementioned U.S. Pat. No. 3,809,481. The basic organization and use of such a system is described in U.S. Pat. No. 3,535,024. Briefly, the system can be used to determined the amplitude of radiation components of various optical frequencies with high precision. Such a determination is made by detecting the amplitude of an interference fringe through a photo-detector 10 and measuring the amplitude for continuously scanned optical path differences in the interferometer. The components of various frequencies in the radiation are determined by utilizing a Fourier transformation of the output amplitude of the detector versus optical path difference.

Basically, the apparatus is comprised of a beam-splitter plate 11 having a half-silvered front surface 12 at one end and a full silvered back surface 13 on the other end of the plate. The half-silvered surface is broad enough to receive and split a beam from an unknown source as well as a beam from a source 14 of known wavelength. The full silvered mirror is also broad enough to receive and deflect the split beams from the unknown source, and the known source passing through a first retroreflector 15, but not through a second retroreflector 16. A fixed mirror 17 receives the split beams through both retroreflectors and doubles them back for recombination at the half-silvered surface 12. The combined beams of the unknown wavelength are deflected by a mirror 18 into the photodetector 10. The recombined beam of the known wavelength is directed into a separate photodetector 19.

A small mirror 20 is used to fold the input laser beam path into the interferometer, and a mirror 21 is used to fold one of the split beam paths to permit the retroreflector 16 to be oriented parallel to the actuator 15 for more compact packaging of the instrument. An additional benefit of using the mirror 21 is that it provides for making small low frequency changes in the optical path of the moving retroreflector to compensate for deviation of the speed of a lead-screw 22 driven by a synchronous motor 23. A moving-coil actuator 24 is employed to move the mirror 21 at low frequencies of 5 to 500 Hz. Alternatively, the moving-coil actuator could be used to move the retroreflector 15, but it is preferred to move the mirror 21 at the frequencies of 5 to 500 Hz because of its smaller mass. Secondary mirrors 15a and 16a may both be mounted on piezoelectric actuators 25 and 26 in order to alter the path lengths of the split beams for compensation of the lead-screw speed at high frequencies above 500 Hz. Variations of the lead-screw speed below 5 Hz will not occur because it is driven by a synchronous motor, or a stepping motor, energized by a sinusoidal signal of substantially constant frequency from a source 27. A stepping motor is basically a form of a synchronous motor; a stepping motor is characterized by having many poles to obtain small angular increments and by low inductance windings.

To accelerate the motor and lead screw at the start of a scan, the drive frequency of the source 27 is gradually brought up to the required scan speed. Thereafter the motor is driven at an accurate, crystal controlled frequency. That, along with a precision ground antibacklash ballscrew and ballnut assembly in the lead screw, ensures a high degree of velocity stability in a low frequency sense. If compensation is necessary for any deviation of the lead-screw speed, it can be provided through the moving-coil actuator 24 and piezoelectric actuators 25 and 26.

To monitor the speed of the retroreflector 16, i.e., to monitor the rate at which the path length difference is varied, the light of known wavelength from the source 14 is split, passed through the retroreflectors, and doubled back to recombine at the half-silvered surface 12. As the path length difference varies, fringes are produced in the recombined light of known wavelength. These fringes occur at a predetermined rate, e.g. 800 kHz, at the desired lead-screw speed. The photo-detector 19 is connected to a conventional FM detector (FIG. 2) which provides an output linearly proportional to lead-screw speed over a range 700 to 900 kHz. By introducing a proper offset voltage in the detector, the output may be made zero at 800 kHz, positive at 900 kHz and negative at 700 kHz in order to provide compensation in the proper direction for any deviation, both over and under the desired scan rate.

Figure 2:
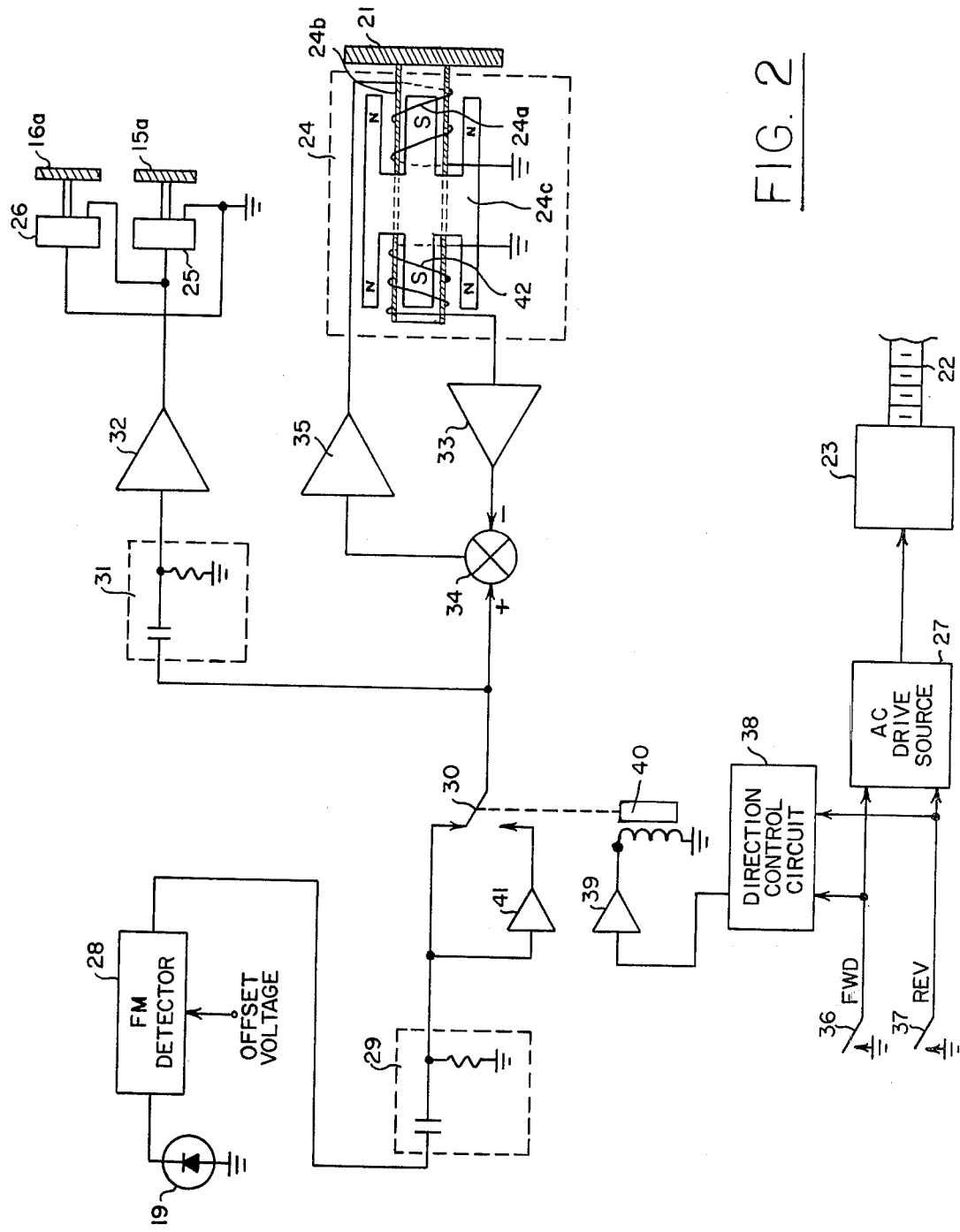
FIG. 2 is a schematic diagram of the improved scan drive system of the present invention.

Referring now to FIG. 2, the output of the FM detector 28, is directed through a filter 20 which passes frequencies above about 5 Hz. The output of the filter is then applied through a switch 30 to a servo loop for the moving-coil actuator 24 and, via a highpass filter 31 and drive amplifier 32, to one of both piezoelectric actuators 25 and 26. If both, one is connected with a polarity opposite the other so that they move in opposite directions in response to any fringe rate deviations that occur at frequencies greater than 500 Hz. The filter 31 blocks deviations below 500 Hz.

The moving-coil actuator 24 is comprised of a moving coil 24a attached to a yoke 24b. The mirror 21 is attached to the yoke. A stationary permanent magnet 24c completes the moving-coil actuator (except for bearings or flexures not shown) to constrain the mirror to move with its reflecting surface always at the same reflecting angle. A velocity pickup coil 42 on the yoke 24b provides a velocity feedback signal through an amplifier 33 to a summing circuit 34. An amplifier 35 then drives the moving coil 24a with the difference between the output of the detector 28 and the velocity feedback signal.

The AC drive source which energizes the synchronous motor 23 is controlled in direction by direction control switches 36 and 37. Upon momentarily closing switch 36, the AC drive source 27 is latched for drive in a forward direction, and upon momentarily closing switch 37, the AC drive source is latched for drive in the reverse direction. These two direction control switches are applied to a direction control circuit 38 which, in its simplest form, is a latching (set-reset) flip-flop. In the forward direction, the circuit is set to provide a zero output signal. The switch 30 is then in the position shown to connect the output of the filter 29 to the compensation drive circuits. When the reverse switch is momentarily closed, the circuit 38 is reset to provide a positive output signal which, through an amplifier 39, energizes a relay 40 to connect the switch 30 to an inverter 41, thereby reversing the sense (polarity) of the signal being applied to the compensation circuit for motion of the lead screw in the opposite direction. A relay switch is shown for simplicity. In practice an electronic switch would be used instead.

Although particular embodiments of the invention have been described and illustrated herein, it is recognized that modifications and variations may readily occur to those skilled in the art. For example, the moving-coil actuator could be applied to the retroreflector 15 instead of the mirror 24. It is therefore intended that the claims be interpreted to cover such modifications and variations.

I claim:

1. In a continuous scan Fourier interference spectrometer of the double-pass type having two cat's-eye retroreflectors and an open-loop, lead-screw drive system for one retroreflector to continuously vary the length of one optical path relative to another optical path through the other retroreflector, the combination comprising a source of a reference beam of known wavelength, said reference beam being directed through said spectrometer, means for detecting the rate of interference fringes of said reference beam as said one retroreflector is driven to vary the length of said one optical path, and for producing an error signal proportional to deviation of said rate with respect to a predetermined rate, and means responsive to said error signal for compensating any deviation of the rate of variation of the path length difference between said one optical path relative to the other optical path from said predetermined rate as said lead-screw drive system continues to vary the length of one optical path relative to the other.

2. The combination of claim 1 including an element attached to a moving-coil actuator for altering the length of one optical path and wherein said compensation means is comprised of low-frequency response means for driving said moving-coil actuator in response to said error signal.

3. The combination of claim 2 including piezoelectric elements attached to mirrors in said retroreflectors for altering the optical path lengths therethrough in response to a signal, and wherein said compensation means is further comprised of high-frequency response means for driving said piezoelectric elements in response to said error signal.

4. The combination of claim 2 wherein said element attached to said moving-coil actuator is comprised of a plane mirror in the path of one of said two retroreflectors positioned to alter the direction of the optical path through a predetermined angle, and said moving-coil actuator moves said mirror with its reflecting surface always at the same reflecting angle.

5. The combination of claim 4 wherein said angle is 90°.

6. In a velocity servo for a continuous scan Fourier interference spectrometer of the double-pass retroreflector type having two retroreflectors and an open-loop, lead-screw drive means for moving one retroreflector continuously from one extreme position to another at a desired rate, apparatus for compensating for any variations in speed of said one retroreflector comprising: a reference beam of known wavelength directed through said interference spectrometer, means for detecting interference fringes of said reference beam directed through said interference spectrometer and for producing an output signal linearly proportional to the speed of said one retroreflector that is zero for a detected rate corresponding to said desired rate, of one polarity for a detected rate greater than said desired rate, and of opposite polarity for a detected rate less than said desired rate, and moving-coil means responsive to said output signal for altering the optical path length through one of said retroreflectors in response to said output signal, thereby compensating for any deviation of said lead-screw drive means from said desired rate.

7. Apparatus as defined in claim 6 including means for detecting the velocity of said moving-coil means and for producing a velocity feedback signal proportional to velocity detected, and means subtracting said velocity feedback signal from said output signal.

8. Apparatus as defined in claim 7 including high-frequency response means in the light path of at least one retroreflector, and a high pass filter coupling said output signal to said high frequency response means for compensation at frequencies higher than can be compensated by said moving-coil actuator.

9. Apparatus as defined in claim 8 wherein said moving coil actuator is attached to a plane mirror in the path of said one of said retroreflectors positioned to alter the direction of the light path through a predetermined angle, and said moving coil actuator moves said mirror in a direction perpendicular to its reflected surface.

* * * * *